United States Patent

Jones

[11] 3,865,138
[45] Feb. 11, 1975

[54] AUTOMATIC SPRINKLER CONTROL DEVICE

[76] Inventor: Wayne D. Jones, 16 Aurora Dr., Cheektowaga, N.Y. 14215

[22] Filed: May 15, 1974

[21] Appl. No.: 470,145

[52] U.S. Cl............... 137/624.12, 137/383, 239/70
[51] Int. Cl......................... A01g 27/00, F16r 35/06
[58] Field of Search..... 137/624.11, 624.12, 624.13, 137/624.15, 624.21; 222/70; 239/70; 251/129

[56] References Cited
UNITED STATES PATENTS

| | | | |
|---|---|---|---|
| 3,119,527 | 1/1964 | Dyer | 222/70 |
| 3,335,753 | 8/1967 | Kiser | 137/624.11 |
| 3,343,721 | 9/1967 | Paley | 222/70 |
| 3,500,844 | 3/1970 | Sanner | 239/70 UX |
| 3,777,937 | 12/1973 | Buck | 222/70 |

Primary Examiner—Alan Cohan

[57] ABSTRACT

A device having an inlet and an outlet and adapted to be connected directly to an outdoor water faucet by the inlet and be self-supporting thereby, and including an electrically controlled solenoid valve interposed between the inlet and outlet to control water flow therethrough, the solenoid valve being connected to an electrically operated timer and to a source of electrical power for the timed operation of the solenoid valve, and with there being a pair of key operated switches associated with the timer and solenoid valve for selecting either manual or automatic operation of the solenoid valve along with selectively de-energizing the solenoid valve during a timed operation cycle without having to wait for the timed cycle to end.

5 Claims, 5 Drawing Figures

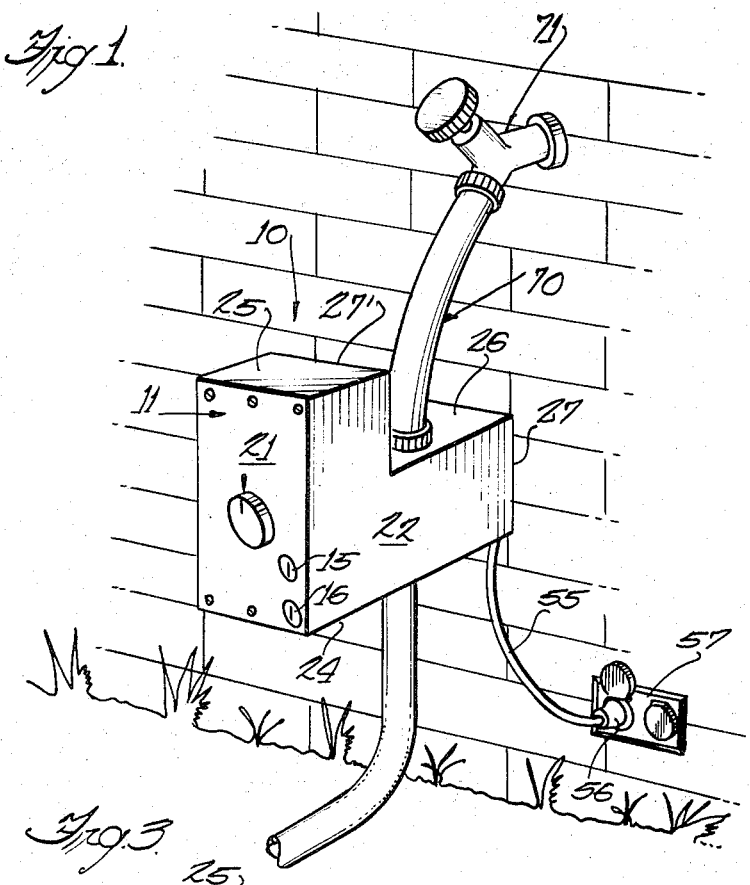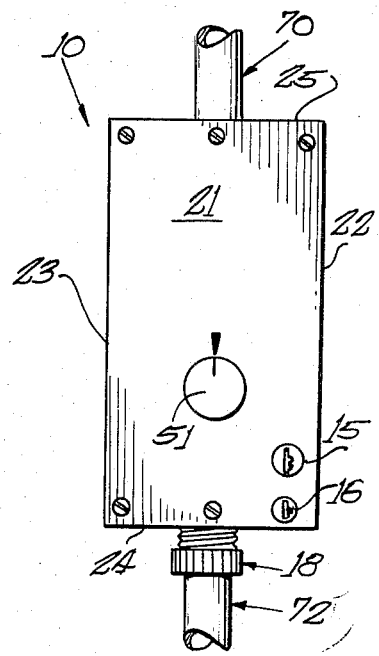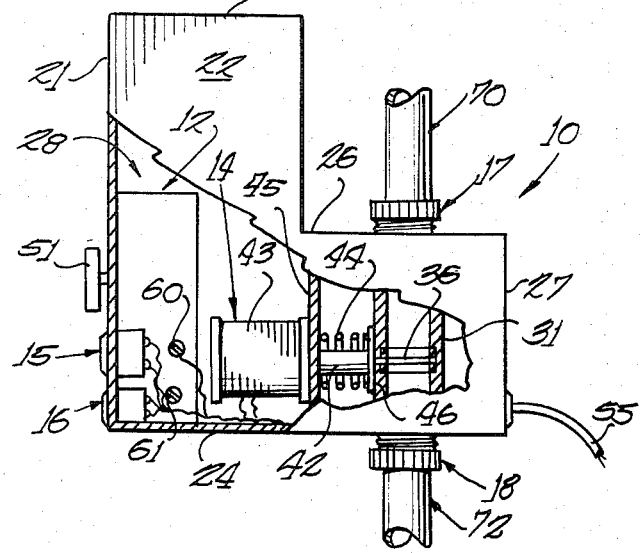

AUTOMATIC SPRINKLER CONTROL DEVICE

BACKGROUND OF THE INVENTION

1. Field of the Invention

This invention relates generally to accessories for use with home sprinklers and the like and more particularly to a novel automatic sprinkler control device adapted to be connected to an outdoor water faucet and supported solely by such connection and operated in a manner to provide automatic operation of a sprinkler or the like attached thereto.

2. Description of the prior Art

To provide an attractive lawn about a home and the like it is necessary that an individual supply sufficient water to insure growth of the grass. This is frequently a problem, such as when the individuals are on vacation or for sprinkling the lawns of homes only occupied over the weekends, such as summer homes and the like, with the lawns of such homes and individuals suffering accordingly.

A further difficulty in watering lawns is that the best times for lawn watering are daybreak and early evening times, but such times for watering schedules are often inconvenient for many persons due to interfering with normal working hours.

A further difficulty encountered in many communities is that water for use in watering lawns is restricted with such watering only being permitted during certain hours of the day, these hours often conflicting with normal working hours so that in such areas it is normally impossible to water a lawn since the individual is not available at home during such hours.

In view of such problems it has been known in the prior art to provide devices for automatically controlling sprinkling systems and the like, with such devices normally being of a complex and costly structure, requiring professional installation, being intended for use with only specific types of sprinklers or sprinkler systems, and the like such that they are not generally suitable for general use by a homeowner without incurring substantial installation or operating expenses.

SUMMARY OF THE INVENTION

The present invention is designed to overcome the above noted limitations that are attendant upon the required watering of a lawn at regular intervals to maintain an aesthetically pleasing appearance, and recognizes the deficiencies and disadvantages of presently available automatic water sprinkling systems as to their excessive expense, need for professional installation, and other drawbacks pricing them out of the range of the normal homeowner. The present invention provides a novel automatic sprinkler control device requiring no special installation or professional skills as upon its being connected to an outdoor water faucet it is self-supporting thereon by such connection and automatically controls the water flowing from such faucet in either an automatic or manual manner selective by the homeowner without the need of any special skills, tools, or expertise.

It is a feature of the present invention to provide an automatic sprinkler control device readily installed on any outdoor water faucet by a homeowner without the need for any special skills or expertise or the need for any special tools or the like.

A further feature of the present invention provides an automatic sprinkler control device which is relatively simple in its construction and which therefore may be readily manufactured at a relatively low cost and by simple manufacturing methods such that it may be retailed at a sufficiently low price to encourage its widespread use among homeowners, office buildings, apartment buildings, and the like for automatic and manual control of a sprinkler.

A further feature of the present invention provides an automatic sprinkler control device which is possessed of few parts and which therefore is unlikely to get out of order.

Still a further feature of the present invention provides an automatic sprinkler control device which is of a rugged and durable construction and which therefore may be guaranteed by the manufacturer to withstand many years of intended usage.

Yet still a further feature of the present invention provides an automatic sprinkler control device which is easy to use and reliable and efficient in operation.

Still a further feature of the present invention provides an automatic sprinkler control device which is substantially tamperproof in operation; and one which is adapted for the controlling of devices other than sprinklers normally receiving water flow from an outdoor water faucet and for which an individual may desire timed operation thereof, such as outdoor fountains, cooling devices, and the like.

Other features and advantages of this invention will be apparent during the course of the following description.

BRIEF DESCRIPTION OF THE DRAWINGS

In the accompanying drawings forming a part of this specification, and in which like reference characters are employed to designate like parts throughout the same:

FIG. 1 is a perspective view of the automatic sprinkler control device of the present invention illustrated as attached to an ordinary outdoor household faucet;

FIG. 2 is a front elevational view of the automatic sprinkler control device;

FIG. 3 is a side elevational view of the automatic sprinkler control device partially broken away to illustrate the placement and details of the interior components thereof and with the valve in the closed position to shut off water flow therethrough;

FIG. 4 is an enlarged fragmentary side elevational view of the solenoid valve in the open position to permit water to flow through the conduit; and FIG. 5 is an electrical schematic diagram of the automatic sprinkler control device.

DESCRIPTION OF THE PREFERRED EMBODIMENT

Referring now to the drawings in detail there is illustrated a preferred form of an automatic sprinkler control device constructed in accordance with the principles of the present invention and designated generally in its entirety by the reference numeral 10 and which is comprised of a housing 11, an electrically operated timer 12, an electrically operated solenoid 14, a pair of electrical switches 15 and 16, an inlet port 17, and an outlet port 18.

The housing 11 is of a hollow L-shaped configuration as illustrated having a front panel 21, side panels 22 and 23, bottom panel 24, top panel 25, middle top panel 26, back panel 27, and middle back panel 27', the panels defining interiorly thereof a compartment 28. The housing 11 may be manufactured out of metal, wood, hard rubber, plastic, or any other suitable satisfactory material with the preferred embodiment being manufactured of a high density polyethylene provided in a variety of colors and decorative patterns appealing to prospective purchasers.

Extending vertically in compartment 28 between bottom panel 24 and middle top panel 26 is a cylindrical conduit 31 interconnecting the inlet port 17 to the outlet port 18. Interposed in conduit 31 and extending normal to the longitudinal axis thereof is an annular groove 32 which receives a cylindrically shaped seal member 33 therein, the seal member having an annular slot 34 defined centrally thereof which is in alignment with a circumferally extending slotted opening 35 in a side wall of conduit 31. A disc member 36 of a diameter substantially equal to the diameter of annular slot 34 is disposed in alignment with slot 35 and groove 34 in a manner permitting reciprocal movement into and out of the conduit 31 in a manner to selectively open and close the conduit passageway and thus control water flow through the conduit. The disc 36 is affixed to free end 41 of a cylindrical plunger 42 which is disposed concentrically with electrical solenoid coil 43 and extends out of one end thereof, energization of the solenoid coil drawing plunger 42 thereinto and opening the conduit passageway with de-energization of the solenoid permitting spring 44 to drive disc member 36 back into the conduit passageway to close the conduit. Spring 44 is disposed concentrically about plunger 42 and interposed between supporting wall 45 on which the solenoid coil 43 is mounted and spring retainer member 46 affixed to the free end 41 of the plunger.

The timer 12 is mounted in compartment 28 and is of a conventional 24 hour timer operable to turn devices on and off once each 24 hour period of time, the timer including a control shaft 51 projecting exteriorly of front wall 21 for the setting of time as to when it is desired to energize the solenoid valve to permit water to flow through the device, and when it is desired to de-energize such solenoid valve to turn off the water flow, the interval of time between turning on and turning off being the duration of the water period. The timer 12 further includes a time motor 52 connected by suitable electrical wires 53 and 54 to an electrical cord 55 projecting outwardly of back panel 27 and terminating in plug 56 adapted to be plugged into a conventional source of household electricity by means of outlet 57. The timer includes the motor operated movable contact 58 and stationary contact 59 operated by the motor and which is of a normally open construction and which closes during the "on" cycle of the device to complete the electrical circuit to the solenoid coil 43 to energize the same, one end of movable contact 58 being connected by wire 60 to the source of electrical energy with the stationary contact 59 being connected by wire 61 to one end of coil 43 which the opposite end is connected by wire 62 to the source of electrical energy. To provide for de-energization of the solenoid coil during a normal "on" cycle without having to manually reset or otherwise alter the timing cycle there is interposed intermediate stationary contact 59 and coil 43 a key operated kill switch 15 which is of a normally closed construction and which is mounted in compartment 28 and projects exteriorly of front wall 21 and is operated by inserting a key thereinto in a manner to open the switch and thus de-energize the coil 43 and shut off the water flow through conduit 31 without having to affect the timing of the device.

In addition, there is provided a further key operated switch 16 which is mounted in compartment 28 and projects exteriorly of front wall 21 and is operated by inserting a key thereinto in order to select between the automatic timed operation of the device and manual operation thereof, this selector switch being connected in electrical parallel with the timer switch and kill switch to provide for the manual energization of coil 43 in one position and to provide for the automatic operation of the coil in a second position.

A curved connector member having a length of from six to eight inches is provided and is designated generally by reference numeral 70 and has one end adapted to be connected to inlet port 17 with the opposite end adapted to be connected to a conventional outdoor water facuet 71, the connector member being of a rigid construction and thus automatically supporting the device on the faucet without the need for a separate support bracket, screws, bolts, and the like. The outlet port 18 is adapted to have connected thereto any conventional hosing 72 for directing the water flow to the sprinkler or other apparatus to be controlled by the device.

In operation, an individual connects device 10 to any conventional outdoor water faucet 71 by connector 70 which suspends and supports the device therefrom without the need for any additional supporting members, after which plug 56 is plugged into a suitable source of electrical power 57. The faucet 71 is then opened to allow water to flow to the solenoid valve. Timer shaft 51 is then set for the desired "on" and "off" times for the energization and de-energization of solenoid coil 43, kill switch 15 is placed in its normally closed position, and selector switch 16 is placed in the automatic position that the solenoid coil is now under the complete control of the timer 12. Should an individual at any time wish to stop the water flow through the device while in a cycle of "on" operation, they merely insert the required key into kill switch 15 which de-energizes the solenoid coil. Alternatively, should an individual during an "off" time of the device wish to manually operate the apparatus connected thereto, they then merely insert a key into key switch 16 to operate the device manually to energize the solenoid coil 43.

It is to be understood that the form of this invention herewith shown and described is to be taken as a preferred example of the same, and that this invention is not to be limited to the exact arrangement of parts shown in the accompanying drawings or described in this specification as various changes in the details of construction as to shape, size, and arrangement of parts may be resorted to without departing from the spirit of the invention, the scope of the novel concepts thereof, or the scope of the sub-joined claims.

Having thus described the invention, what is claimed is:

1. An automatic sprinkler control device intended for use with a conventional outdoor water faucet for controlling the flow of water therefrom to an apparatus being controlled thereby, the device comprising:

a housing having a compartment defined interiorly thereof;

an inlet port extending exteriorly of the housing;

a outlet port extending exteriorly of the housing;

a conduit disposed in said compartment and interconnecting said inlet port and said outlet port;

a rigid tubular connector having one end adapted to be affixed to said inlet port and having the other end thereof adapted to be affixed to the outlet of a conventional outdoor mounted water faucet, said connector rigidly supporting said housing relative to said outdoor faucet;

electrically operated solenoid control valve interposed in said conduit and operable between an open position to permit water to flow therethrough and a closed position blocking said conduit to prevent water flow therethrough;

an electric motor operated timer mechanism mounted in said compartment and including an electric motor and a timer operated switch associated therewith, a shaft projecting from said timer mechanism to a position exteriorly of said housing and adapted for operation to set a time at which said switch will be moved to a closed position to energize said solenoid and when said switch will be moved to an open position to de-energize said solenoid;

suitable electrical wiring means interconnecting said timer operated switch to said solenoid valve means;

suitable electric wiring means adapted to connect said solenoid coil and said timer mechanism and said timer operated switch to a suitable source of electrical power, said means projecting exteriorly of said housing;

a key operated electric kill switch mounted in said compartment and projecting exteriorly of said housing and adapted for operation from a normally closed position to an open position by insertion of an operating key through the projecting portion thereof, said kill switch electrically interposed in series relationship intermediate said timer mechanism switch and said solenoid coil to provide manual de-energization of said coil when said timer operated switch is in a closed energizing position; and a key operated selector switch mounted in said compartment and projecting exteriorly thereof and which is of a normally open switch construction and which is electrically interposed in series relationship with said solenoid coil means and operable between an inoperative open position and an operative closed position to energize said coil means, said selector switch being disposed in electrical parallel relationship with said series connected timer operated switch and key operated kill switch.

2. The device as set forth in claim 1 wherein said housing is of a generally L-shaped configuration having vertical rectangularly shaped front panel, opposed vertically disposed L-shaped side wall panels, a rectangularly shaped horizontal bottom panel, a rectangularly shaped vertical back panel, a horizontally disposed rectangular top panel, and a horizontal middle top panel, and a vertical middle back panel, said panels defining interiorly thereof said compartment; and wherein said inlet port and said outlet port are in axial alignment with each other with said inlet port disposed on said horizontal middle top panel and said outlet port disposed on said horizontal bottom panel.

3. The device as set forth in claim 2 wherein said valve means comprises an annular groove formed inwardly of said conduit passageway and disposed normal to the longitudinal axis of said passageway, a cylindrical ring shaped seal member disposed in said groove, an annular slot disposed in the interior surface of said seal member and extending circumferally thereabout, a slot extending circumferally of said conduit disposed in alignment with said seal member slot, a solid disc member having a diameter substantially equal to the diameter of said seal member slot and disposed in alignment with said conduit slot and said seal member slot for reciprocal movement relative thereto between an inoperative position spaced outwardly of said conduit passageway and an operative position received in said seal member slot blocking said passageway, an elongated rod having one end associated with a projecting portion of said disc member and having an opposite end projecting outwardly therefrom, a solenoid coil disposed concentric with said rod and receiving said projecting end telescopically therein such that energization of said coil effects said rod being drawn thereinto with de-energization of said coil releasing said rod, and a coiled spring disposed concentrically with said rod and having one end resting on an end of said coil with the opposite end connected to said rod adjacent its connection to said disc member, said coil urging said rod outwardly of said coil to drive said disc member into its operative locking position relative to said conduit passageway.

4. The device as set forth in claim 3 wherein said one end of said coil is mounted to an interior supporting wall disposed inwardly of said housing compartment and spaced from said conduit.

5. The device as set forth in claim 4 wherein said housing is manufactured of a high density polyethylene plastic material.

* * * * *